(12) United States Patent
Li et al.

(10) Patent No.: US 12,184,344 B2
(45) Date of Patent: Dec. 31, 2024

(54) UE AIDED ANTENNA CALIBRATION

(71) Applicant: Telefonaktiebolaget LM Ericsson (publ), Stockholm (SE)

(72) Inventors: Shaohua Li, Kanata (CA); Jianguo Long, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 58 days.

(21) Appl. No.: 18/022,609

(22) PCT Filed: Aug. 24, 2020

(86) PCT No.: PCT/IB2020/057913
§ 371 (c)(1),
(2) Date: Feb. 22, 2023

(87) PCT Pub. No.: WO2022/043731
PCT Pub. Date: Mar. 3, 2022

(65) Prior Publication Data
US 2023/0318717 A1    Oct. 5, 2023

(51) Int. Cl.
*H04L 5/12* (2006.01)
*H04B 7/06* (2006.01)
(Continued)

(52) U.S. Cl.
CPC .......... *H04B 17/12* (2015.01); *H04B 7/0626* (2013.01); *H04B 7/0639* (2013.01); *H04B 17/14* (2015.01)

(58) Field of Classification Search
CPC .... H04B 17/12; H04B 7/0626; H04B 7/0639; H04B 17/14
(Continued)

(56) References Cited

U.S. PATENT DOCUMENTS

| 8,295,869 | B2 | 10/2012 | Karlsson et al. |
| 2010/0008411 | A1* | 1/2010 | Hansen ................ H04B 7/0663 375/224 |

(Continued)

FOREIGN PATENT DOCUMENTS

WO    2015094045 A1    6/2015

OTHER PUBLICATIONS

Author Unknown, "Technical Specification Group Radio Access Network; Evolved Universal Terrestrial Radio Access (E-UTRA); Physical channels and modulation (Release 16)," Technical Specification 36.211, Version 16.2.0, Jun. 2020, 3GPP Organizational Partners, 248 pages.

(Continued)

*Primary Examiner* — Helene E Tayong
(74) *Attorney, Agent, or Firm* — Sonoda & Kobayashi Intellectual Property Law; Sarvajit S. Patil

(57) ABSTRACT

Embodiments of the present disclosure provide methods and apparatuses for base station antenna calibration. A method is implemented in a base station for a cellular communications system. The method includes configuring a user equipment, UE, for a plurality of channel state information, CSI, reports associated to respective CSI reporting bands, the respective CSI reporting bands being either: (a) different subsets of sub-bands within a downlink bandwidth of the base station or (b) different downlink bandwidth parts served by the base station; receiving the CSI reports from the UE; estimating phase and delay errors for a plurality of transmit antenna branches of the base station; compensating for the estimated phase and delay errors for the transmit antenna branches based on the CSI reports received from the UE; and transmitting a downlink signal while compensating for the estimated phase and delay errors for the transmit antenna branches of the base station.

20 Claims, 12 Drawing Sheets

(51) Int. Cl.
   *H04B 17/12*      (2015.01)
   *H04B 17/14*      (2015.01)
(58) Field of Classification Search
   USPC ............................................. 375/262
   See application file for complete search history.

(56) References Cited

U.S. PATENT DOCUMENTS

| | | | |
|---|---|---|---|
| 2010/0278058 A1* | 11/2010 | Damnjanovic | H04L 1/0026 455/67.11 |
| 2013/0051321 A1* | 2/2013 | Barbieri | H04L 1/0029 370/328 |
| 2018/0175993 A1 | 6/2018 | Onggosanusi et al. | |
| 2019/0149250 A1 | 5/2019 | Jidhage et al. | |

OTHER PUBLICATIONS

Author Unknown, "Technical Specification Group Radio Access Network; Evolved Universal Terrestrial Radio Access (E-UTRA); Physical layer procedures (Release 16)," Technical Specification 36.213, Version 16.2.0, Jun. 2020, 3GPP Organizational Partners, 576 pages.

Author Unknown, "Technical Specification Group Radio Access Network; Evolved Universal Terrestrial Radio Access (E-UTRA); Radio Resource Control (RRC); Protocol specification (Release 16)," Technical Specification 36.331, Version 16.1.1, Jul. 2020, 3GPP Organizational Partners, 1,078 pages.

Author Unknown, "Technical Specification Group Radio Access Network; NR; Physical channels and modulation (Release 16)," Technical Specification 38.211, Version 16.2.0, Jun. 2020, 3GPP Organizational Partners, 131 pages.

Author Unknown, "Technical Specification Group Radio Access Network; NR; Physical layer procedures for data (Release 15)," Technical Specification 38.214, Version 15.4.0, Dec. 2018, 3GPP Organizational Partners, 102 pages.

Author Unknown, "Technical Specification Group Radio Access Network; NR; Radio Resource Control (RRC) protocol specification (Release 16)," Technical Specification 38.331, Version 16.1.0, Jul. 2020, 3GPP Organizational Partners, 906 pages.

Alcatel-Lucent Shanghai Bell, et al., "R1-113333: On handling of timing misalignment and antenna calibration," 3GPP TSG RAN WG1 Meeting #66bis, Oct. 10-14, 2011, Zhuhai, China, 4 pages.

Ericsson, "R1-1714287: On partial bands and CSI acquisition," 3GPP TSG-RAN WG1 #90, Aug. 21-25, 2017, Prague, Czech Republic, 5 pages.

Huawei, et al., "R1-112045: Prioritization of real-life network deployment issues," 3GPP TSG RAN WG1 Meeting #66, Aug. 22-26, 2011, Athens, Greece, 4 pages.

LG Electronics, "R1-113191: Investigation on the impact of timing misalignment/antenna calibration," 3GPP TSG RAN WG1 Meeting #66bis, Oct. 10-14, 2011, Zhuhai, China, 6 pages.

International Search Report and Written Opinion for International Patent Application No. PCT/IB2020/057913, mailed Jun. 1, 2021, 17 pages.

* cited by examiner

UE AIDED ANTENNA CALIBRATION

This application is a 35 U.S.C. § 371 national phase filing of International Application No. PCT/IB2020/057913, filed Aug. 24, 2020, the disclosure of which is incorporated herein by reference in its entirety

TECHNICAL FIELD

The non-limiting example embodiments of the present disclosure generally relate to a technical field of wireless communication and specifically to methods, apparatuses, and computer program products for antenna calibration.

BACKGROUND

Antenna phase alignment has a great effect on system performance. FIG. 1 is a diagram depicting a first antenna 100, a second antenna 101, a third antenna 102, and a fourth antenna 103 that comprise correlated downlink transmit antennas 104. As depicted in FIG. 1, the antennas 104 are one of the most commonly used 4-antenna setups for Long Term Evolution (LTE) enhanced Node B (eNB) and will likely also be used in New Radio (NR) low band systems. The antennas 104 are cross-polarized, i.e., the antennas 104 are either placed with a slant angle of 45° (polarization A) or −45° (polarization B). The first antenna 100 and the third antenna 102 are a first cross-polarized antenna pair, and the second antenna 101 and the fourth antenna 103 are a second cross-polarized antenna pair. The two cross-polarized antenna pairs are closely spaced with 0.5λ to 1λ separation. The advantage of such a configuration is that it provides excellent beamforming gain because the antennas 104 comprise correlated and co-polarized antenna pairs. The first antenna 100 and the second antenna 101 are a first co-polarized antenna pair, and the third antenna 102 and the fourth antenna 103 are a second co-polarized antenna pair. Moreover, this particular 4-antenna setup allows reasonable multiplexing gain of up to four layers thanks to a combination of polarization diversity and sufficient spatial diversity.

Beamforming with correlated antennas requires that the phase difference between individual antenna elements is small. Any antenna error that affects phase relations could prevent systems from realizing full beamforming potential. Ideally, to achieve beamforming gain, the antennas 104 shown in FIG. 1 should be calibrated. However, because of cost, most of the 4 transmit antennas setups currently used in LTE eNBs are uncalibrated. When the antennas 104 are uncalibrated, the signal over each antenna has a different phase $\varphi_k$, k=0,1,2,3. When the wireless industry evolves into Fifth Generation (5G), those radio-antenna systems will be reused.

For each pair of correlated co-polarized antenna pairs of FIG. 1, i.e., the first co-polarized antenna pair for polarization A or the second co-polarized antenna pair for polarization B, the main lobe of the radiation pattern or beam during transmission points in the direction where the phases of antenna signals are added constructively. Hence, beam direction depends on the phase difference between two co-polarized antennas such as the first antenna 100 and the second antenna 101 or the third antenna 102 and the fourth antenna 103. When the phase difference between two correlated antennas changes, the beam direction changes, as illustrated by FIG. 2.

The phase difference between antennas in each co-polarized antenna pair can be expressed approximately as:

$$\emptyset_A = \varphi_1 - \varphi_0$$

and $$\emptyset_B = \varphi_3 - \varphi_2.$$

If the antennas are calibrated, i.e., $\varphi_k$=0 for all k=0,1,2,3, then $\emptyset_A = \emptyset_B$=0 and the beams from two polarizations are aligned and point to bore sight, as illustrated by the solid line in FIG. 2.

If the antennas are not calibrated, i.e., $\varphi_k \neq 0$ for all k=0,1,2,3, but the phase differences of two polarizations are the same, i.e., $\emptyset_A = \emptyset_B \neq 0$, the beams from two polarizations are still aligned while beam direction is deviated from bore sight. For example, when $\emptyset_A = \emptyset_B = 135°$, the beams of the two polarizations can be illustrated by the dashed line in FIG. 2.

However, when the phase difference from two beams is not equal, i.e., $\emptyset_A \neq \emptyset_B$, the two beams will point to different directions. The example shown in FIG. 2 can be considered such as a case when $\emptyset_A = 0°$ and $\emptyset_A = 135°$. This misalignment leads to great performance degradation. The phase of signal on antenna k, $\varphi_k$, for subcarrier frequency f, can be modeled as follows:

$$\varphi_k = \varphi_{k0} + 2\pi f \Delta t_k.$$

There are two components in $\varphi_k$: one is a fixed frequency independent phase $\varphi_{k0}$, another is a frequency dependent phase caused by timing delay $\Delta t_k$.

A related-art software-based antenna calibration and estimation method is depicted in FIG. 3. The related-art procedure to estimate the antenna timing delay and phase error show communication between a New Radio base station (gNB) and a user equipment (UE). Based on this procedure, one can attempt to calibrate the antenna so that the phases of different antennas are aligned.

Assuming the number of transmitted antennas is M and the transmission frequency band is divided into K subbands of frequency span $\Delta f$, where each subband is numbered k where k∈{1, ... K} and k=1 represents the frequency band of lowest frequency, then the signal $y_k$ received at a receiving radio device, including the signals from the M transmitting antennas, can be assumed to follow the following expression for a given subband k:

$$y_k = H_k C_k w_k x_k + e_k \qquad (1)$$

where the transmission channel matrix $H_k$ is a representation of the transmission channel, $e_k$ represents interference and noise experienced on the transmission channel, $x_k$ is the signal transmitted from the transmitting radio device, and $C_k$ is a diagonal matrix capturing the delays of the M different transmitting antennas:

$$C_k = \mathrm{diag}\{e^{-j(2\pi \Delta f k \tau_1 + \theta_1)} \cdots e^{-j(2\pi \Delta f k \tau_M + \theta_M)}\} \qquad (2)$$

where $\tau_m$ is the time delay associated with the mth transmit antenna, and $\theta_m$ is the phase associated with the mth transmit antenna. The value of the time delay $\tau_m$ of the mth transmission equipment and the phase can be assumed to be the same in all k frequency subbands. $w_k$ is the precoding matrix.

For subband precoding matrix indicator (PMI) feedback, the UE decides the preferred matrix $w_k$ based on the following:

$$w_k = \mathrm{argmax}_w (w^H C_k^H H_k^H H_k C_k w)$$

subject to $\|w\|_2 = 1$ \qquad (3)

Based on the channel characteristics, the correlation matrix $E(H_k^H H_k) = R_k$. Based on simple mathematical manipulation, the optimal w can be obtained:

$$w_k = C_k^H u_k \qquad (4)$$

where $u_k$ is the eigenvector of $R_k$. When cross-polarized antennas are used, one can assume $R_k$ is the same for different k and the correlation matrix is the same for antennas of two polarizations. Thus, the $u_k$ can be simplified into the following:

$$u_k = \begin{bmatrix} b \\ \beta_k b \end{bmatrix} \quad (5)$$

where $\beta_k$ is a scaler and reflects the correlation between two polarizations, and b is a vector with $$\frac{M}{2}$$

elements.

Consider the following relations:

$$\alpha_1 = \text{PhaseDiff}(w_2, w_1)/(2\pi\Delta f)$$

$$\alpha_2 = \text{PhaseDiff}(w_3, w_2)/(2\pi\Delta f)$$

$$\alpha_{K-1} = \text{PhaseDiff}(w_K, w_{K-1})/(2\pi\Delta f) \quad (6)$$

where the function PhaseDiff calculates the element-wise phase difference and $\Delta f$ is the difference in frequency between subbands k and k+1. From the above expressions, $\alpha_k^{(m)}$, the mth element of each of the vectors $\alpha_k$ (where $k \in [1, \ldots, K-1]$) is an estimate of the time delay $\tau_m$ of the mth transmit antenna:

$$\alpha_k^{(m)} \approx \tau_m \quad (7)$$

Thus, the delay can be estimated by $\alpha_k^{(m)}$. From the above relationship, ideally the 2 subbands are sufficient to obtain an estimate of the M time delays $\tau_1, \ldots, \tau_M$. Obviously, increasing the number of subbands can increase the delay estimation accuracy.

In addition, assume $w_k^{(m)}$ is the mth element of $w_k$. Consider the following relations:

For the first polarization (A), assume the following:

$$\beta_{k,A}^{(1)} = \angle\left(\frac{w_k^{(2)}}{w_k^{(1)}}\right) = 2\pi\Delta f k(\tau_2 - \tau_1) + (\theta_2 - \theta_1) + \gamma_{2,1} \quad (8)$$

$$\beta_{k,A}^{(2)} = \angle\left(\frac{w_k^{(3)}}{w_k^{(1)}}\right) = 2\pi\Delta f k(\tau_3 - \tau_1) + (\theta_3 - \theta_1) + \gamma_{3,1}$$

$$\cdots$$

$$\beta_{k,A}^{\left(\frac{M}{2}-1\right)} = \angle\left(\frac{w_k^{\left(\frac{M}{2}\right)}}{w_k^{(1)}}\right) = 2\pi\Delta f k\left(\tau_{\frac{M}{2}} - \tau_1\right) + \left(\theta_{\frac{M}{2}} - \theta_1\right) + \gamma_{M/2,1}$$

For the second polarization (B), assume the following:

$$\beta_{k,B}^{(1)} = \angle\left(\frac{w_k^{\left(\frac{M}{2}+2\right)}}{w_k^{\left(\frac{M}{2}+1\right)}}\right) = 2\pi\Delta f k\left(\tau_{\left(\frac{M}{2}+2\right)} - \tau_{\left(\frac{M}{2}+1\right)}\right) + \left(\theta_{\frac{M}{2}+2} - \theta_{\frac{M}{2}+1}\right) + \gamma_{2,1} \quad (9)$$

$$\cdots$$

$$\beta_{k,B}^{(M/2-1)} = \angle\left(\frac{w_k^{(M)}}{w_k^{\left(\frac{M}{2}+1\right)}}\right) = 2\pi\Delta f k\left(\tau_M - \tau_{\left(\frac{M}{2}+1\right)}\right) + \left(\theta_M - \theta_{\frac{M}{2}+1}\right) + \gamma_{M/2,1}$$

where the function $\angle(\cdot)$ represents the angle of $(\cdot)$ with range $[\pi, \pi]$, and $$\gamma_{m,n} = \angle\left(\frac{b_m}{b_n}\right),$$

where $b_m$ is the mth element of vector b.

For the sake of simplification, assume the relative delay and phase of the mth transmit antenna of polarization X (X=A or B) to the first transmit antenna of polarization X (X=A or B) are $\Delta\tau_m^{(X)}$ and $\Delta\theta_m^{(X)}$ (X=A or B), respectively, then:

$$\beta_{k,X}^{(m)} = 2\pi\Delta f k(\Delta\tau_m^{(X)}) + \Delta\theta_m^{(X)} + \gamma_{m,1} (X = A \text{ or } B) \quad (10)$$

From $$\beta_{k,X}^{(m)}\left(m = 1, \ldots, \frac{M}{2} - 1\right),$$

one can estimate the phase difference and delay difference between different polarizations.

In principle, the delay can be estimated based on Equation (6) if the ideal $w_k$ can be obtained. However, the delay estimation algorithm of Equation (6) cannot be directly used due to NR codebook constraint. With the NR codebook, when subband PMI reporting is configured, except with 2 antenna ports, a single wideband beam direction indication is reported for the entire channel state information (CSI) reporting band and one subband polarization co-phasing indication is reported for each subband in the CSI reporting band. More specifically, $w_k$ is given by the following:

$$w_k = \begin{bmatrix} v \\ \varphi_k v \end{bmatrix} \quad (11)$$

where v, which indicates beam direction, is wideband and is not changed across subbands; only the polarization cophasing variable $\varphi_k$ is different from subband to subband. Thus, based on Equation (6), $\alpha_k^{(1)} \sim \alpha_k^{(M/2)}$ are equal to zero. Thus, the estimated delay is zero. It means the delay estimation will fail based on simple NR PMI feedback. To solve this problem, configuration of the csi-ReportingBand or multiple bandwidth part to enable multiple reports and thus to enable PMI-based antenna calibration is disclosed.

SUMMARY

Embodiments of the present disclosure provide methods and apparatuses for base station antenna calibration. A method is implemented in a base station for a cellular communications system, The method includes configuring a user equipment, UE, for a plurality of channel state information, CSI, reports associated to a respective plurality of CSI reporting bands, the respective plurality of CSI reporting bands being either: (a) different subsets of a plurality of sub-bands within a downlink bandwidth of the base station or (b) different downlink bandwidth parts served by the base station; receiving the plurality of CSI reports from the UE; estimating phase and delay errors for a plurality of transmit antenna branches of the base station; compensating for the estimated phase and delay errors for the plurality of transmit antenna branches of the base station based on the plurality of CSI reports received from the UE; and transmitting a downlink signal while compensating for the estimated phase and delay errors for the plurality of transmit antenna branches of the base station.

To compensate the phase and delay error, the base station (e.g., gNB) configures two or more CSI reports for the UE, wherein a different CSI reporting band is configured for a different CSI report or a different CSI report is associated with a different bandwidth part so that at least two different wideband PMIs can be acquired across the whole frequency band to enable delay and phase estimation based on NR codebook. The main embodiment includes the following:

1) For each CSI report, a different CSI reporting band is configured.
   a. As the subembodiment of the first embodiment, the csi-reporting band is adaptively adjusted based on residual delay.
2) Or, a different CSI report is associated with a different downlink bandwidth part given in the associated CSI-ResourceConfig for channel measurement.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
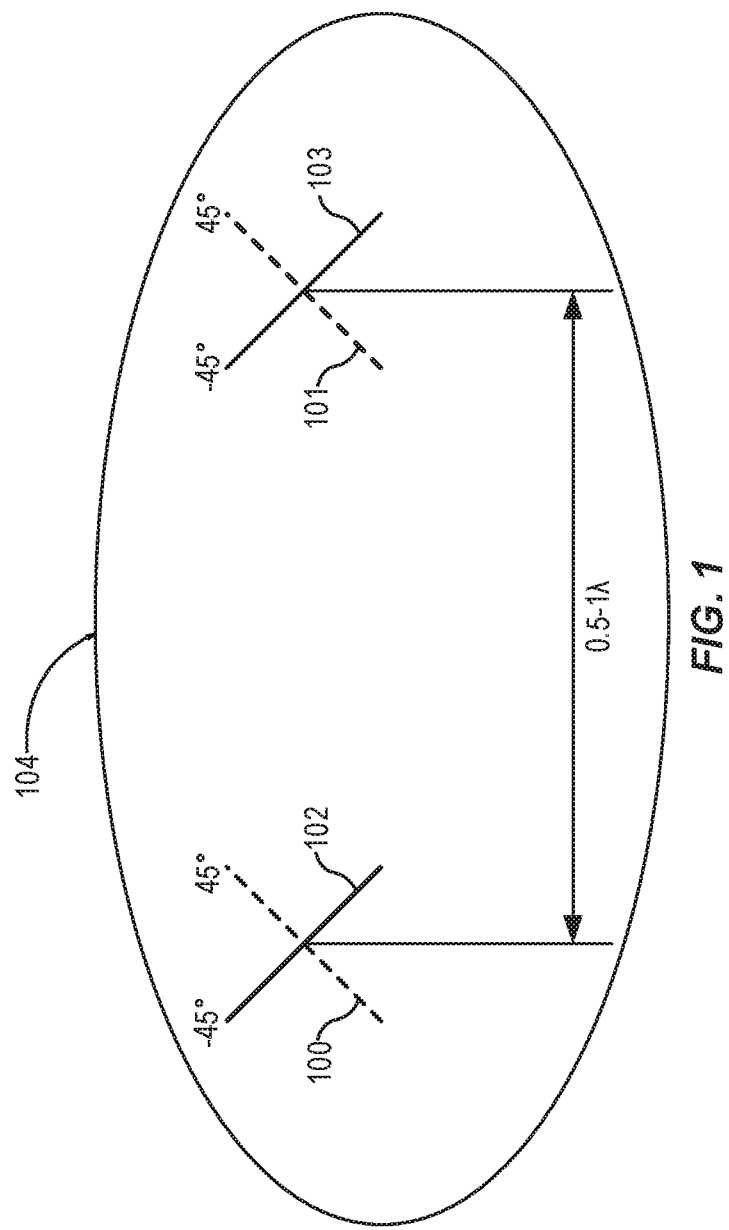
FIG. 1 is a diagram showing a 4 correlated downlink transmit antennas.
Figure 2:
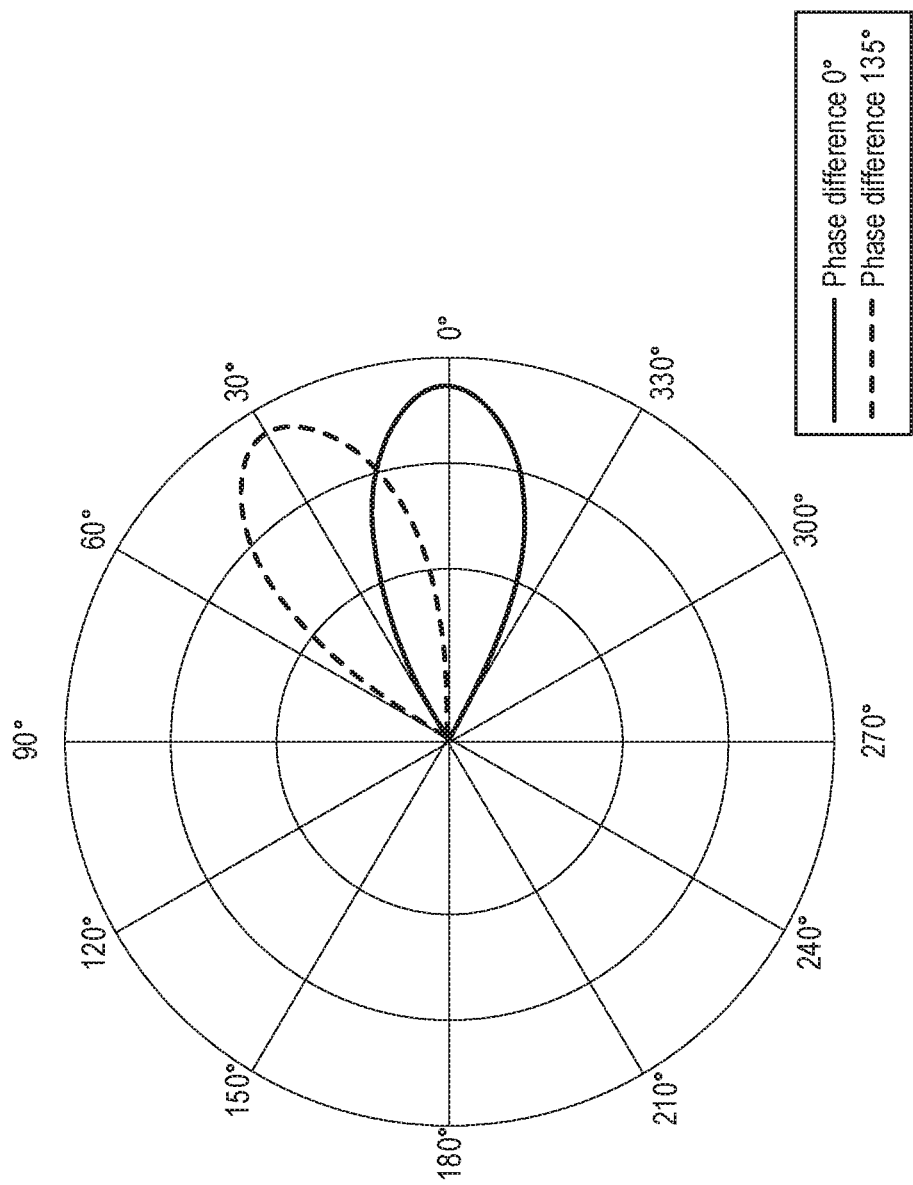
FIG. 2 is a polar radiation chart showing beams pointing to different directions with phase difference changes.
Figure 3:
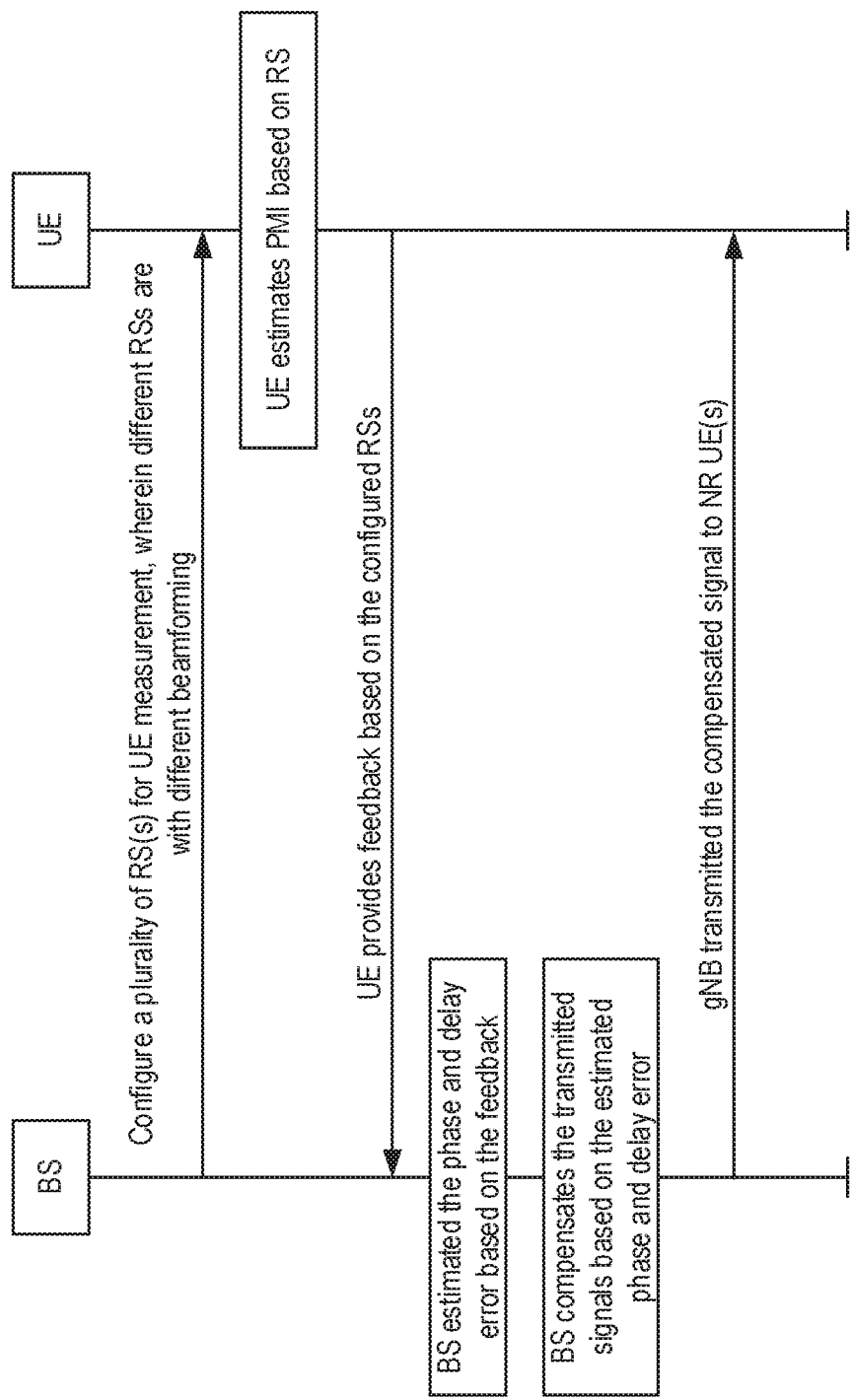
FIG. 3 is a flowchart showing the related-art antenna calibration algorithm according to the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 4:
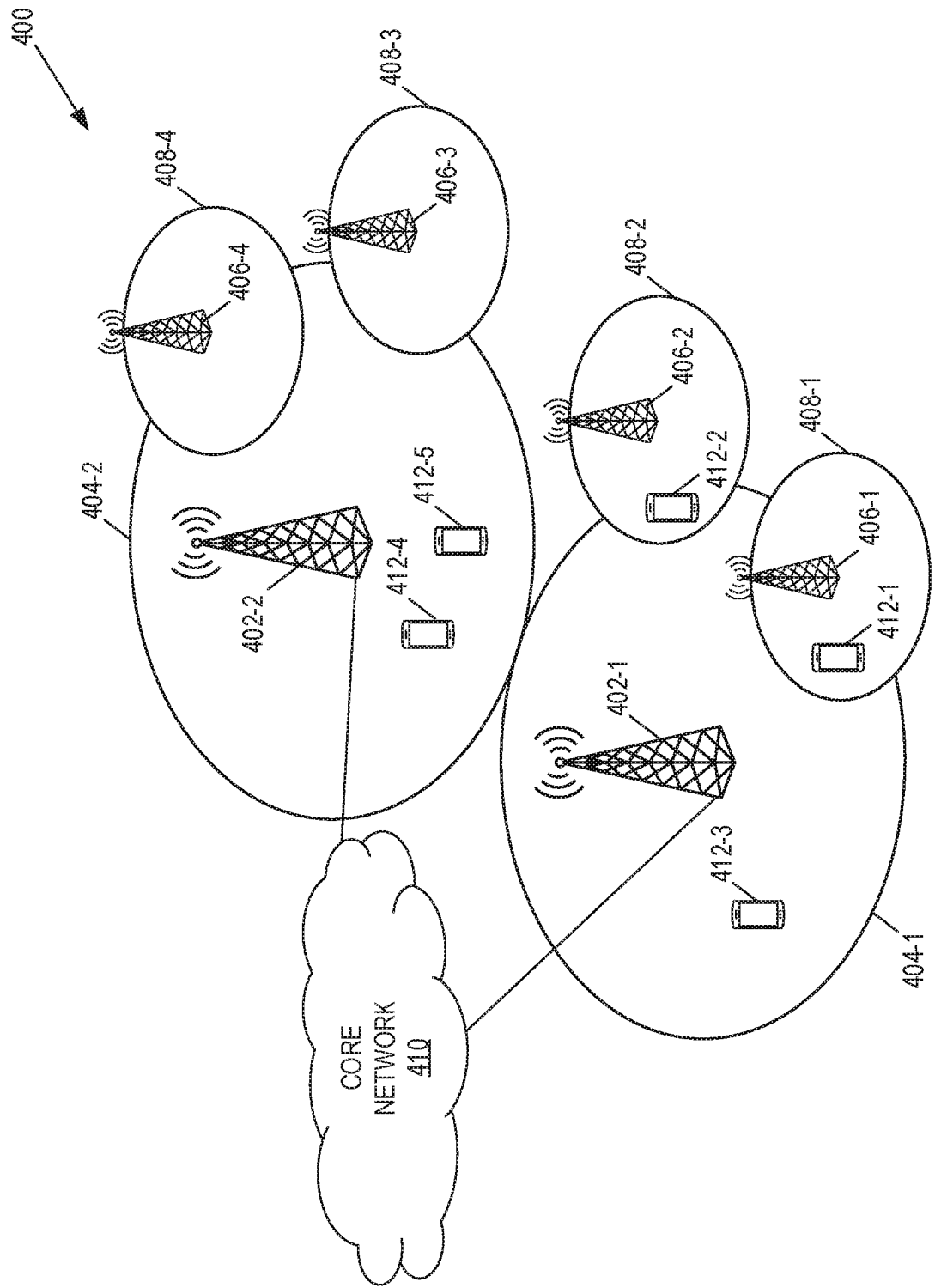
FIG. 4 illustrates one example of a cellular communications system according to some embodiments of the present disclosure.

FIG. 4 illustrates one example of a cellular communications system 400 in which embodiments of the present disclosure may be implemented. In the embodiments described herein, the cellular communications system 400 is a 5G system (5GS) including a Next Generation RAN (NG-RAN) and a 5G Core (5GC) or an Evolved Packet System (EPS) including an Evolved Universal Terrestrial RAN (E-UTRAN) and a Evolved Packet Core (EPC). In this example, the RAN includes base stations 402-1 and 402-2, which in the 5GS include NR base stations (gNBs) and optionally next generation eNBs (ng-eNBs) (e.g., LTE RAN nodes connected to the 5GC) and in the EPS include eNBs, controlling corresponding (macro) cells 404-1 and 404-2. The base stations 402-1 and 402-2 are generally referred to herein collectively as base stations 402 and individually as base station 402. Likewise, the (macro) cells 404-1 and 404-2 are generally referred to herein collectively as (macro) cells 404 and individually as (macro) cell 404. The RAN may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The cellular communications system 400 also includes a core network 410, which in the 5G System (5GS) is referred to as the 5GC. The base stations 402 (and optionally the low power nodes 406) are connected to the core network 410.

The base stations 402 and the low power nodes 406 provide service to wireless communication devices 412-1 through 412-5 in the corresponding cells 404 and 408. The wireless communication devices 412-1 through 412-5 are generally referred to herein collectively as wireless communication devices 412 and individually as wireless communication device 412. In the following description, the wireless communication devices 412 are oftentimes UEs, but the present disclosure is not limited thereto.

The advantages of the solution according to the present disclosure included, but are not limited to, the following:

With the disclosed method, the delay and phase errors can be estimated and compensated based on the New Radio (NR) codebook.

The disclosed method can be used for any antenna configuration.

With the disclosed method, the selected user equipment's (UE's) normal data transmission impact is minimized.

Figure 5:
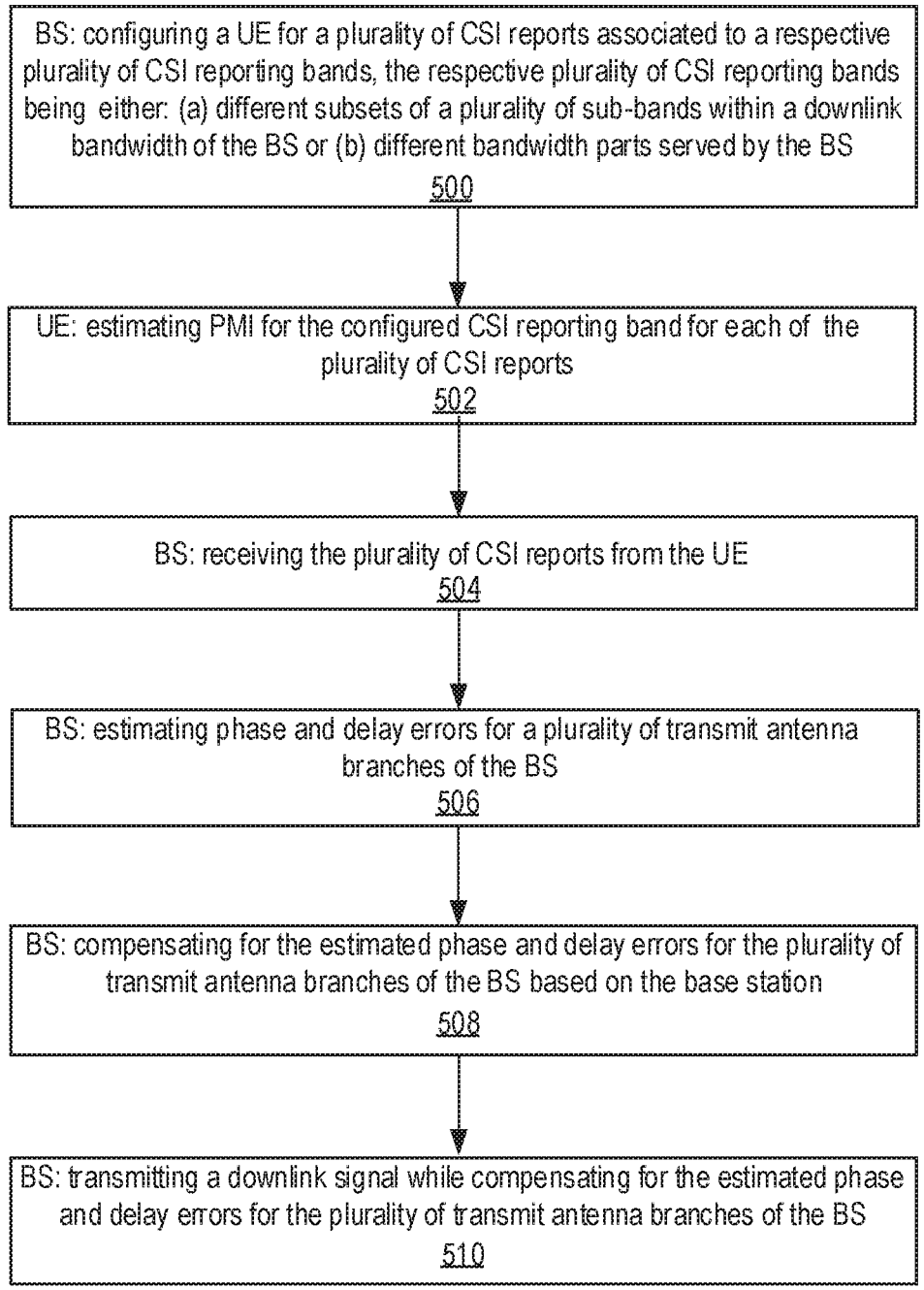
FIG. 5 is a flow chart showing the basic procedure for the basic concept of the embodiment of the present disclosure.

The basic concept of the present disclosure is shown in FIG. 5. To compensate the phase and delay error introduced by antennas (104), in step 500, the base station (402) such as a New Radio base station (gNB) configures two or more channel state information (CSI) reports for the UE (412). For each CSI report, a different CSI reporting band is configured, or a different bandwidth part (BWP) is associated so that the CSI for a different band can be reported independently. In step 502, the UE (412) estimates the CSI, including the precoding matrix indicator (PMI), channel quality indicator (CQI), rank, and layer indicator for the configured CSI reporting band independently for each CSI reports. In step 504, the UE (412) reports those CSIs. In step 506, the base station (402) estimates the phase and delay error based on these CSI reports. The base station (402) further makes compensation based on estimated phase and delay error for the transmitted signal in step 508. Compensating (510) for the estimated phase and delay errors for the plurality of transmit antenna branches (104) of the base station (402) is accomplished by applying amplitude correction and phase correction to the downlink signal for each antenna branch. In some example embodiments, amplitude correction and the phase correction are applied in the time domain. In other example embodiments, amplitude correction and the phase correction are applied in the frequency domain. In yet other example embodiments amplitude correction and the phase correction are applied in both the time domain and the frequency domain.

Figure 6:
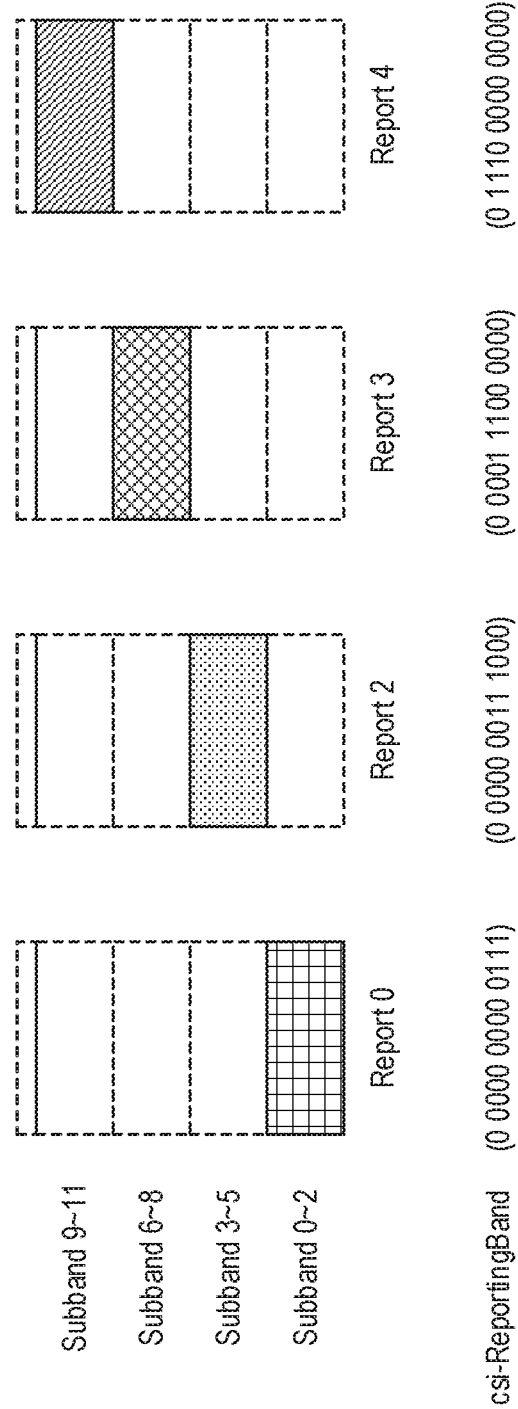
FIG. 6 is a diagram showing channel state information (CSI) reporting band configurations for different CSI reports.

In the first embodiment, to compensate the phase and delay error, the base station (402) configures two or more CSI reports for the UE (412). For each CSI report, a different CSI reporting band is configured and at least a partial of a reporting band of those CSI reports is not overlapped. One example is shown in FIG. 6. In this example, assume that the bandwidth is 20 MHz, which is divided to 51 resource blocks (RBs), and one bandwidth part is configured, the subband size is 4 RBs, and four CSI-reports are configured, then 13 subbands can be obtained; then csi-ReportingBand in the reporting setting associated with the first CSI report can be set to [0 0000 0000 0111] to indicate subband0~subband 2 to be configured for the first CSI report, the csi-ReportingBand in the reporting setting associated with the second CSI report can be set to [0 0000 0011 1000] to indicate subband3~subband5 to be configured for the second CSI report, and so on. Based on 38.214, when wideband CQI reporting is configured, a wideband CQI is reported for each codeword for the entire CSI reporting band. When subband CQI reporting is configured, one CQI for each codeword is reported for each subband in the CSI reporting band. Thus, for the first report, UE only measures over subband0~subband2, and for the second report, UE only measures over subband 3~subband5, and so on. Thus, wideband v in $w_k$ in the rth CSI report is independent and different from the lth CSI report if r≠l. The change of v over frequency can reflect the delay and thus can be used for delay estimation. The detailed estimation method is shown subsequently.

To reduce the overhead, two CSI reports can be configured. The CSI reporting band configuration for each CSI report can be decided by the delay range. To avoid the delay ambiguity caused by signal phase wrapaound, the maximum frequency gap shall be satisfied as follows:

$$\Delta f \leq \frac{1}{2 * \Delta \tau_{max}} \quad (12)$$

Figure 7:
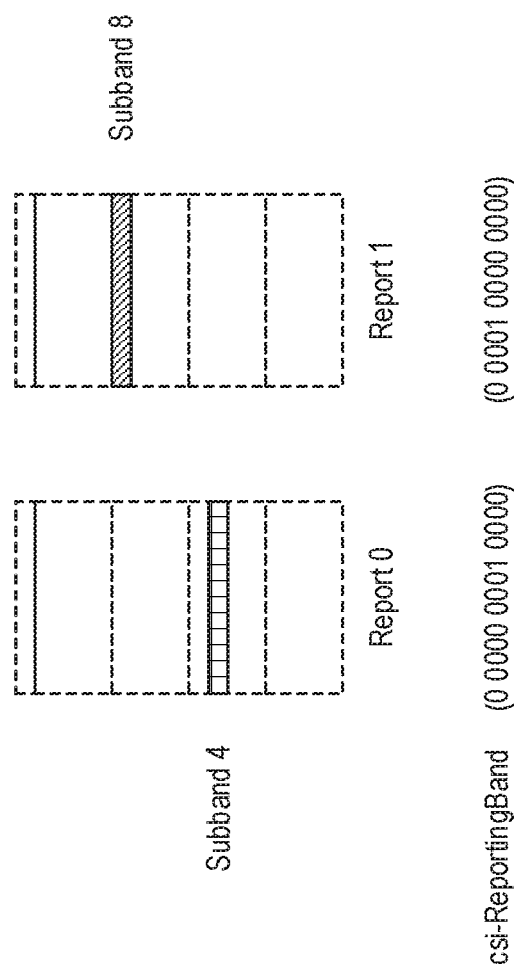
FIG. 7 is a diagram showing a CSI reporting band configuration to overcome the delay estimation ambiguity.

Increasing Δf can increase the estimation accuracy. Thus, gNB can first decide the frequency gap based on the maximum delay error and then make the reporting band configuration with the determined frequency gap. As one example, according to Third Generation Partnership Project (3GPP) requirements, the delay error between any two ports cannot exceed 65 ns for bandwidth Δf ≤7.69 MHz. Thus, the maximum frequency gap between the two reports should less than 5 subbands. Thus, one option for the reporting band configuration for 20 MHz can be shown in FIG. 7. For different bandwidth and different numerology, the above principle can be applied, but the detail subband configuration may be adapted for a different bandwidth and numerology.

As one subembodiment of the first embodiment, the csi-Reporting band is adaptively adjusted based on residual delay. In this subembodiment, a smaller subband gap is configured for the first iteration of antenna calibration and a larger subband gap is configured for the subsequent iterations of antenna calibration. In the first stage, due to the smaller subband gap configured, a large delay error can be handled. As shown in Equation (12), if the Δf is decreased, the upper bound of $\Delta\tau_{max}$ can be increased. However, the delay estimation accuracy is affected. The delay estimation accuracy is affected by the gap, and a large gap leads to more accurate delay estimation. Thus, after the first iteration, the delay can be compensated. As a result, the residual delay is very small. Therefore, a large subband gap does not introduce any delay ambiguity if the residual delay is small. In the same time, the delay estimation accuracy can be increased via gap increase.

Figure 8:
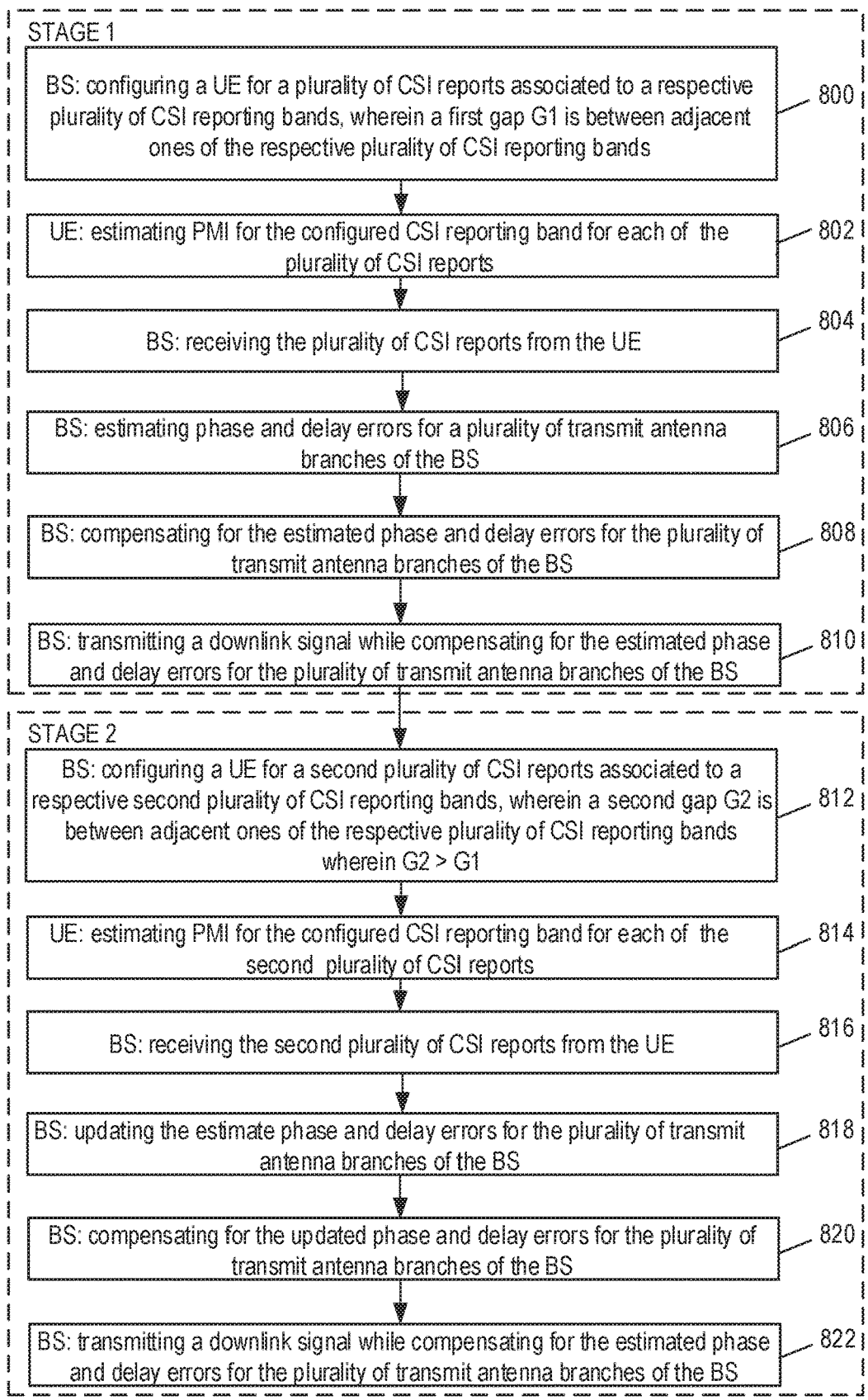
FIG. 8 is a diagram showing multiple stage calibration, according to the present disclosure.

In a first stage shown in FIG. 8 as STAGE 1, the base station (402) configures (800) the UE (412) for a plurality of reports associated to a respective plurality of CSI reporting bands, wherein a first gap G1 is between adjacent ones of the respective plurality of CSI reporting bands. In response, the UE (412) estimates (802) PMI for the configured CSI reporting band for each of the plurality of CSI reports. The base station (402) receives (804) the plurality of CSI reports from the UE (412). In response, the base station estimates (806) phase and delay errors for a plurality of transmit antenna branches (104) of the base station (402). The base station (402) compensates (808) for the estimated phase and delay errors for the plurality of transmit antenna branches (104) of the base station (402). The base station (402) can then transmit (810) a downlink signal while compensating for the estimated phase and delay errors for the plurality of transmit antenna branches (104) of the base station (402).

In a second stage, shown in FIG. 8 as STAGE 2, the base station (402) configures (812) the UE (412) for a second plurality of reports associated to a respective second plurality of CSI reporting bands, wherein a second gap G2 is between adjacent ones of the respective plurality of CSI reporting bands, wherein the second gap G2 is greater than the first gap G1. In response, the UE (412) estimates (814) PMI for the configured CSI reporting band for each of the second plurality of CSI reports. The base station (402) receives (816) the second plurality of CSI reports from the UE (412). In response, the base station (402) updates (818) the estimated phase and delay errors for a plurality of transmit antenna branches (104) of the base station (402). The base station (402) compensates (820) for the updated phase and delay errors for the plurality of transmit antenna branches (104) of the base station (402). The base station (402) can then transmit (822) a downlink signal while compensating for the updated estimated phase and delay errors for the plurality of transmit antenna branches (104) of the base station (402).

Figure 9:
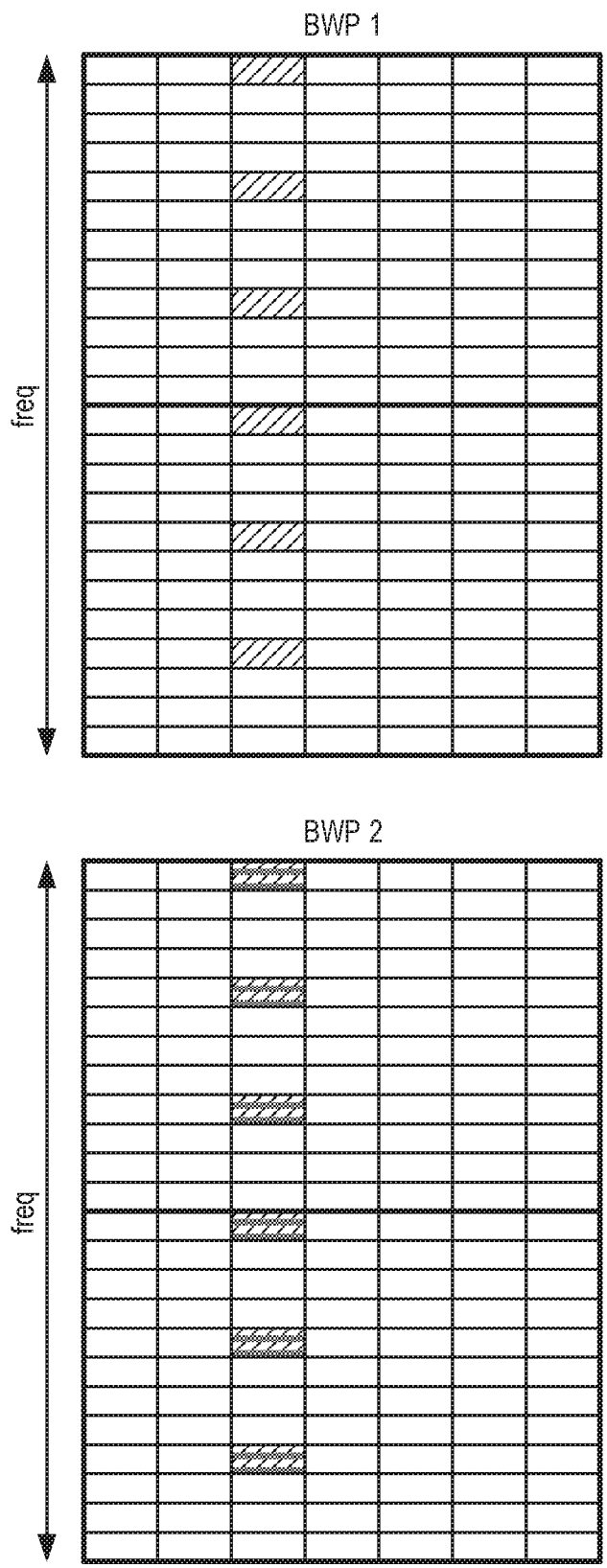
FIG. 9 is diagrams showing the configuration of bandwidth parts (BWPs) for CSI reports to enable the delay and phase error estimation.

In the second embodiment, to compensate the phase and delay error, base station (402) configures two or more CSI reports for the UE, and a different CSI report is associated with a different downlink bandwidth part given in the associated CSI-ResourceConfig for channel measurement, wherein at least a partial of a bandwidth part is not overlapped. In this embodiment, two or more CSI bandwidth parts are configured. As one example shown in FIG. 9, two CSI bandwidth parts are configured as BWP1 and BWP2, non-zero power channel state information reference signal #1 (NZP-CSI-RS#1; marked as diagonal lines) is transmitted in BWP1, and NZP-CSI-RS#2 (marked as horizontal stripes through diagonal lines) is transmitted in BWP2. Two CSI reports are configured, the first CSI report is associated with the NZP-CSI-RS#1 for channel measurements, and the second CSI report is associated with the NZP-CSI-RS#2. With these configurations, for the first CSI report, UE performs CSI estimation over the subbands in BWP1; for the second CSI report, UE performs CSI estimation over the subbands in BWP2. Thus, wideband v in $w_k$ in the rth report is independent and different from the lth report if r≠l. The change of v over frequency can reflect the delay. Therefore, it can be used for delay estimation. The detail estimation method is shown subsequently.

In the third embodiment, multiple UEs are used to enable the phase and delay estimation. In this embodiment, via csi-ReportingBand or bandwidth part configuration, the first UE is configured to report for the first subbands and the second UE is configured to report for the second subbands, and at least a partial of the subbands of the first subbands and of the second subbands are not overlapped. By this way, gNB can get multiple CSI reports and thus can estimate the phase of the first subbands and the second subbands. Furthermore, the delay can be estimated based on the obtained phase.

Furthermore, to prevent UE from performing the averaging of the channel across multiple timing delayed CSI-RS signals, timeRestrictionForChannelMeasurements is configured in CSI-ReportConfig for these CSI reports. Based on the 3GPP TS38.214 standard, if a UE is configured with a higher layer parameter timeRestrictionForChannelMeasurements in CSI-ReportConfig, the UE shall derive the channel measurements for computing CSI reported in uplink slot n based only on the most recent, and no later than the CSI reference resource, occasion of NZP CSI-RS associated with the CSI resource setting without any averaging of past channel estimates.

Moreover, to improve the accuracy of the delay and phase estimation, the rank restriction or PMI restriction may be configured for those CSI reports.

In addition to the two or more CSI reports which are configured for antenna calibration, additional CSI reports may be configured for normal data transmission. With these configurations, normal data transmission performance can be maintained and the performance loss due to rank or PMI restriction can be avoided.

As shown in step 500 in FIG. 5, two or more CSI reports are configured so as to obtain two or more of different and independent wideband v and $w_k$. With $w_k$ and based on Equations (8), (9), and (10), $\beta_{k,x}^{(m)}$ can be obtained from different reports and then the delay and phase can be estimated. As one example, $\beta_{k,X}^{(m)}$ for the $r_l$th report is denoted as $\beta_{k,X}^{(m)}(r_l)$. Assume the report band gravity for the $r_l$th is $k_l$, then the following equation for two reports case is true:

$$\begin{bmatrix} \beta_{k,X}^{(m)}(r_0) \\ \beta_{k,X}^{(m)}(r_1) \end{bmatrix} = \begin{bmatrix} 2\pi k_0 \Delta f & 1 \\ 2\pi k_1 \Delta f & 1 \end{bmatrix} \begin{bmatrix} \Delta \tau_m^{(X)} \\ \Delta \theta_m^{(X)} + \gamma_{m,1} \end{bmatrix} + n \quad (13)$$

where n is additional white noise. Thus, $$\Delta \tau_m = \frac{\beta_{k,X}^{(m)}(r_1) - \beta_{k,X}^{(m)}(r_0)}{2\pi(k_1 - k_0)\Delta f} \quad (14)$$

$$\Delta \theta_m^{(X)} + \gamma_{m,1} = \frac{k_0 \beta_{k,X}^{(m)}(r_1) - k_1 \beta_{k,X}^{(m)}(r_0)}{k_0 - k_1} \quad (15)$$

Based on Equations (14) and (15), the delay and phase error between the antennas can be estimated and can be compensated afterwards.

Figure 10:
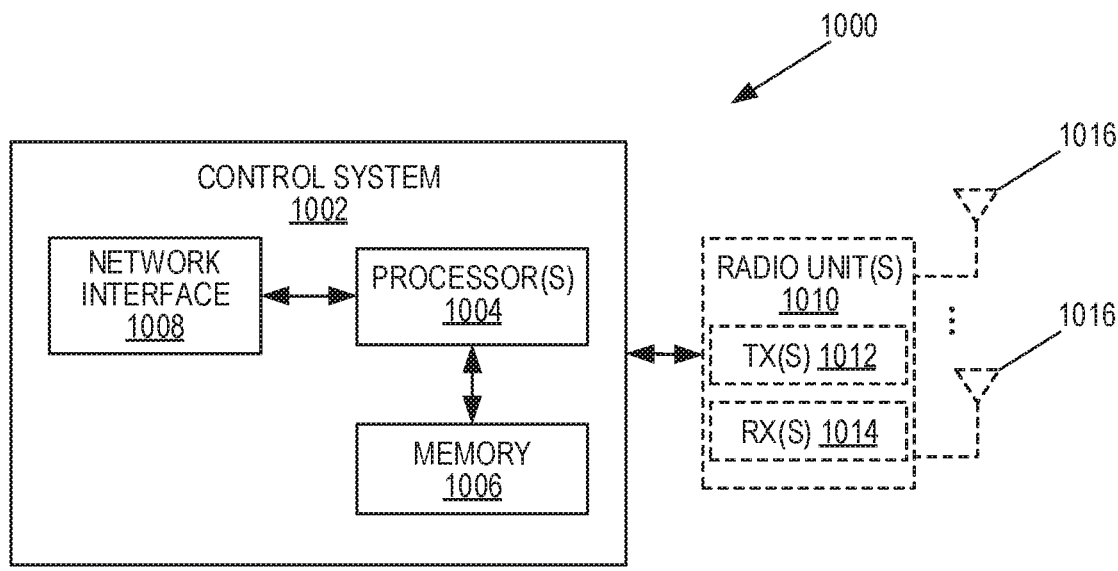
FIG. 10 is a schematic block diagram of a radio access node according to some embodiments of the present disclosure.

FIG. 10 is a schematic block diagram of a radio access node 1000 according to some embodiments of the present disclosure. Optional features are represented by dashed boxes. The radio access node 1000 may be, for example, a base station 402 or 406 or a network node that implements all or part of the functionality of the base station 402 or gNB described herein. As illustrated, the radio access node 1000 includes a control system 1002 that includes one or more processors 1004 (e.g., Central Processing Units (CPUs), Application Specific Integrated Circuits (ASICs), Field Programmable Gate Arrays (FPGAs), and/or the like), memory 1006, and a network interface 1008. The one or more processors 1004 are also referred to herein as processing circuitry. In addition, the radio access node 1000 may include one or more radio units 1010 that each includes one or more transmitters 1012 and one or more receivers 1014 coupled to one or more antennas 1016. The radio units 1010 may be referred to or be part of radio interface circuitry. In some embodiments, the radio unit(s) 1010 is external to the control system 1002 and connected to the control system 1002 via, e.g., a wired connection (e.g., an optical cable). However, in some other embodiments, the radio unit(s) 1010 and potentially the antenna(s) 1016 are integrated together with the control system 1002. The one or more processors 1004 operate to provide one or more functions of a radio access node 1000 as described herein. In some embodiments, the function(s) are implemented in software that is stored, e.g., in the memory 1006 and executed by the one or more processors 1004.

Figure 11:
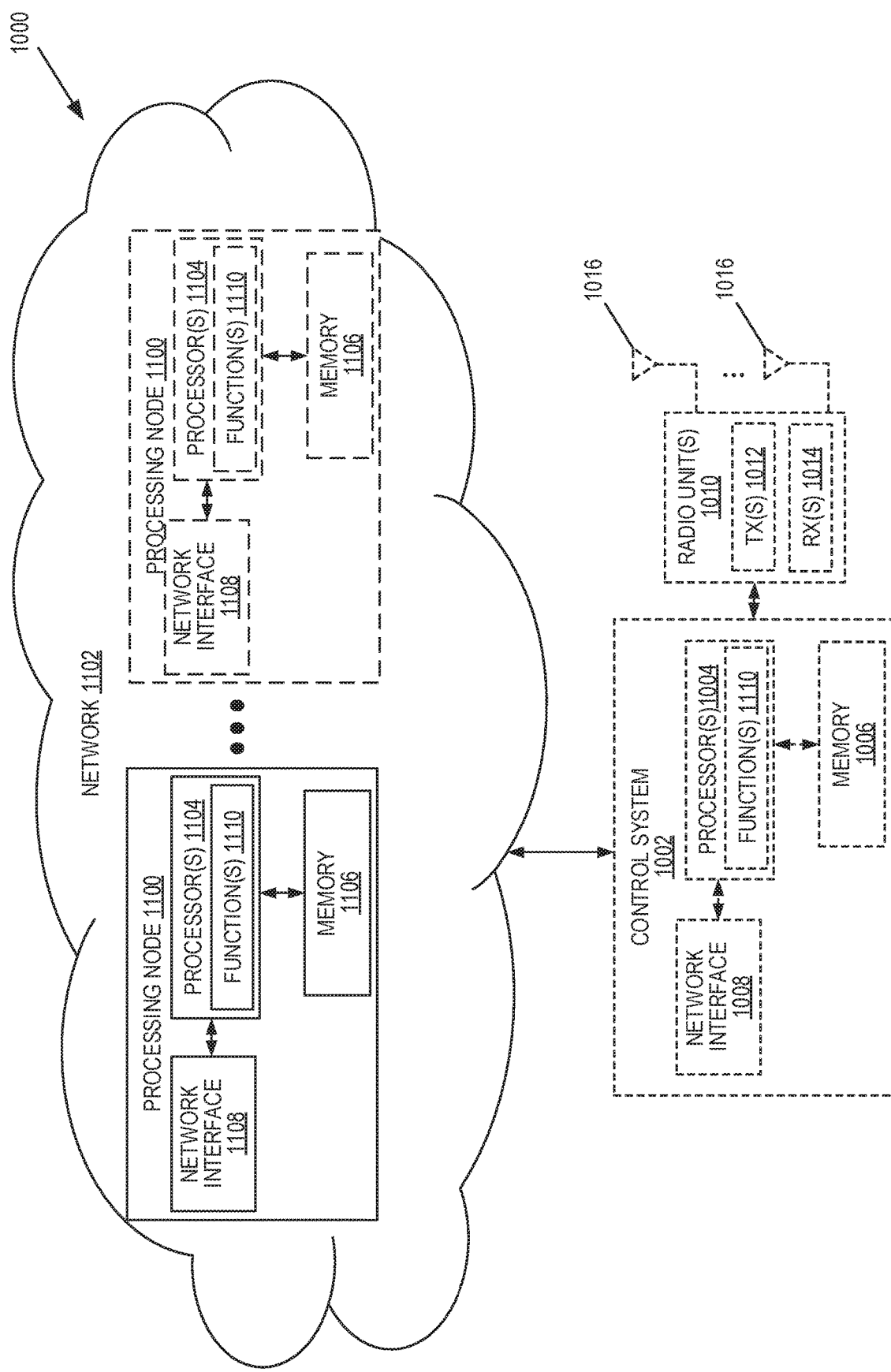
FIG. 11 is a schematic block diagram that illustrates a virtualized embodiment of the radio access node of FIG. 10 according to some embodiments of the present disclosure.

FIG. 11 is a schematic block diagram that illustrates a virtualized embodiment of the radio access node 1000 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1000 in which at least a portion of the functionality of the radio access node 1000 is implemented as a virtual component(s) (e.g., via a virtual machine(s) executing on a physical processing node (s) in a network(s)). As illustrated, in this example, the radio access node 1000 may include the control system 1002 and/or the one or more radio units 1010, as described above. The control system 1002 may be connected to the radio unit(s) 1010 via, for example, an optical cable or the like. The radio access node 1000 includes one or more processing nodes 1100 coupled to or included as part of a network(s) 1102. If present, the control system 1002 or the radio unit(s) are connected to the processing node(s) 1100 via the network 1102. Each processing node 1100 includes one or more processors 1104 (e.g., CPUs, ASICs, FPGAs, and/or the like), memory 1106, and a network interface 1108.

In this example, functions 1110 of the radio access node 1000 described herein are implemented at the one or more processing nodes 1100 or distributed across the one or more processing nodes 1100 and the control system 1002 and/or the radio unit(s) 1010 in any desired manner. In some particular embodiments, some or all of the functions 1110 of the radio access node 1000 described herein are implemented as virtual components executed by one or more virtual machines implemented in a virtual environment(s) hosted by the processing node(s) 1100. As will be appreciated by one of ordinary skill in the art, additional signaling or communication between the processing node(s) 1100 and the control system 1002 is used in order to carry out at least some of the desired functions 1110. Notably, in some embodiments, the control system 1002 may not be included, in which case the radio unit(s) 1010 communicate directly with the processing node(s) 1100 via an appropriate network interface(s).

In some embodiments, a computer program including instructions which, when executed by at least one processor, causes the at least one processor to carry out the functionality of radio access node 1000 or a node (e.g., a processing node 1100) implementing one or more of the functions 1110 of the radio access node 1000 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
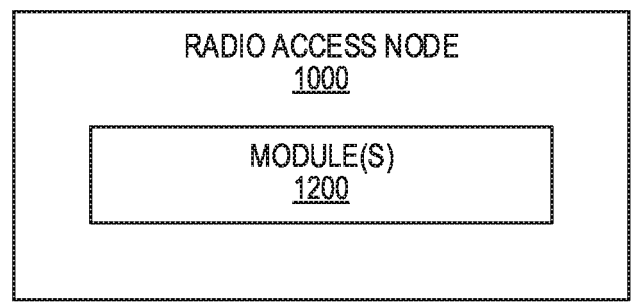
FIG. 12 is a schematic block diagram of the radio access node of FIG. 10 according to some other embodiments of the present disclosure.

FIG. 12 is a schematic block diagram of the radio access node 1000 according to some other embodiments of the present disclosure. The radio access node 1000 includes one or more modules 1200, each of which is implemented in software. The module(s) 1200 provide the functionality of the radio access node 1000 described herein. This discussion is equally applicable to the processing node 1100 of FIG. 11 where the modules 1200 may be implemented at one of the processing nodes 1100 or distributed across multiple processing nodes 1100 and/or distributed across the processing node(s) 1100 and the control system 1002.

Figure 13:
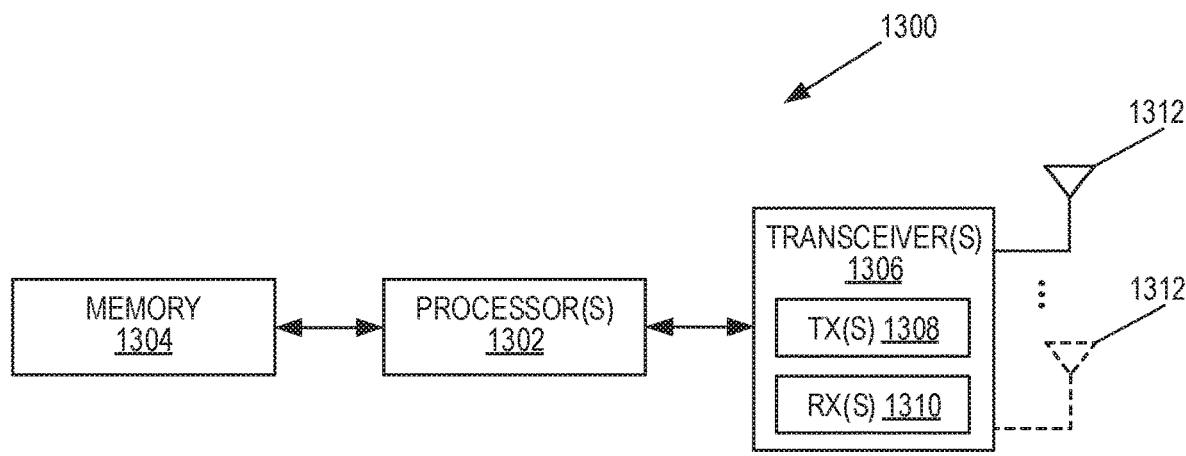
FIG. 13 is a schematic block diagram of a User Equipment device (UE) according to some embodiments of the present disclosure.

FIG. 13 is a schematic block diagram of a wireless communication device 1300 according to some embodiments of the present disclosure. As illustrated, the wireless communication device 1300 includes one or more processors 1302 (e.g., CPUs, ASICs, FPGAs, and/or the like), memory 1304, and one or more transceivers 1306 each including one or more transmitters 1308 and one or more receivers 1310 coupled to one or more antennas 1312. The transceiver(s) 1306 includes radio-front end circuitry connected to the antenna(s) 1312 that is configured to condition signals communicated between the antenna(s) 1312 and the processor(s) 1302, as will be appreciated by one of ordinary skill in the art. The processors 1302 are also referred to herein as processing circuitry. The transceivers 1306 are also referred to herein as radio circuitry. In some embodiments, the functionality of the wireless communication device 1300 described above may be fully or partially implemented in software that is, e.g., stored in the memory 1304 and executed by the processor(s) 1302. Note that the wireless communication device 1300 may include additional components not illustrated in FIG. 13 such as, e.g., one or more user interface components (e.g., an input/output interface including a display, buttons, a touch screen, a microphone, a speaker(s), and/or the like and/or any other components for allowing input of information into the wireless communication device 1300 and/or allowing output of information from the wireless communication device 1300), a power supply (e.g., a battery and associated power circuitry), etc.

In some embodiments, a computer program including instructions which, when executed by at least one processor, causes the at least one processor to carry out the functionality of the wireless communication device 1300 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
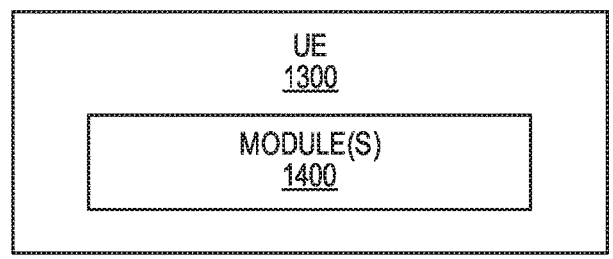
FIG. 14 is a schematic block diagram of the UE of FIG. 13 according to some other embodiments of the present disclosure.

FIG. 14 is a schematic block diagram of the wireless communication device 1300 according to some other embodiments of the present disclosure. The wireless communication device 1300 includes one or more modules 1400, each of which is implemented in software. The module(s) 1400 provide the functionality of the wireless communication device 1300 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AAS Active Antenna System
AF Application Function
AMF Access and Mobility Function
AN Access Network
AP Access Point
ASIC Application Specific Integrated Circuit
AUSF Authentication Server Function
BWP Bandwidth Part
CPU Central Processing Unit
CQI Channel Quality Indicator
CSI-RS Channel State Information Reference Signal
DFT Discrete Fourier Transform
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server
IoT Internet of Things
IP Internet Protocol
LTE Long Term Evolution
MME Mobility Management Entity
MTC Machine Type Communication
MU-MIMO Multi-User Multiple Input Multiple Output
NEF Network Exposure Function
NF Network Function
NR New Radio
NRF Network Function Repository Function
NSSF Network Slice Selection Function
NZP-CSI-RS Non-Zero Power Channel State Information Reference Signal
OTT Over-the-Top
PC Personal Computer
PCF Policy Control Function
PDSCH Physical Downlink Shared Channel
P-GW Packet Data Network Gateway
PMI Precoding Matrix Indicator
QoS Quality of Service
RAM Random Access Memory
RAN Radio Access Network
RB Resource Block
RI Rank Indicator
ROM Read Only Memory
RRH Remote Radio Head
RTT Round Trip Time
SCEF Service Capability Exposure Function
SMF Session Management Function
SRS Sounding Reference Signal
TTI Transmission Time Interval
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

What is claimed is:

1. A method implemented in a base station for a cellular communications system, the method comprising:
configuring a user equipment, UE, for a first plurality of channel state information, CSI, reports associated to a respective first plurality of CSI reporting bands, the respective first plurality of CSI reporting bands being either: (a) different subsets of a plurality of sub-bands within a downlink bandwidth of the base station or (b) different downlink bandwidth parts served by the base station;

receiving the first plurality of CSI reports from the UE;
estimating phase and delay errors for a plurality of transmit antenna branches of the base station based on the plurality of CSI reports received from the UE; and
compensating for the estimated phase and delay errors for the plurality of transmit antenna branches of the base station.

2. The method of claim 1 further comprising transmitting a downlink signal compensated for the estimated phase and delay errors for the plurality of transmit antenna branches of the base station.

3. The method of claim 1 wherein the respective plurality of CSI reporting bands are at least partially non-overlapping.

4. The method of claim 1 wherein the respective plurality of CSI reporting bands are different subsets of the plurality of sub-bands within the downlink bandwidth of the base station.

5. The method of claim 4 wherein the different subsets of the plurality of sub-bands each consist of a different sub-band from among the plurality of sub-bands.

6. The method of claim 1 wherein the respective plurality of CSI reporting bands are different downlink bandwidth parts served by the base station.

7. The method of claim 1 wherein a frequency gap between adjacent pairs of the respective plurality of CSI reporting bands has a first frequency gap size, and the method further comprises:
configuring the UE for a second plurality of CSI reports associated to a respective second plurality of CSI reporting bands, the respective second plurality of CSI reporting bands being different subsets of the plurality of sub-bands within the downlink bandwidth of the base station or different downlink bandwidth parts served by the base station, wherein the frequency gap between adjacent pairs of the second plurality of CSI reporting bands has a second frequency gap size that is greater than the first frequency gap size;
receiving the second plurality of CSI reports from the UE; and
updating the estimated phase and delay errors for the plurality of transmit antenna branches of the base station based on the second plurality of CSI reports received from the UE.

8. The method of claim 7 further comprising compensating for the updated, estimated phase and delay errors for the plurality of transmit antenna branches of the base station.

9. The method of claim 8 further comprising transmitting the downlink signal while compensating for the estimated phase and delay errors for the plurality of transmit antenna branches of the base station.

10. The method of claim 7 wherein the UE that is configured with the first plurality of CSI reports is not the same UE that is configured with the second plurality of CSI reports.

11. The method of claim 7 wherein the UE that is configured with the first plurality of CSI reports is the same UE that is configured with the second plurality of CSI reports.

12. The method of claim 1 wherein the plurality of CSI reports is only two CSI reports, and wherein the CSI reporting band configuration for each of the two CSI reports is based on a delay range $\Delta\tau_{max}$.

13. The method of claim 12 wherein a maximum frequency gap $\Delta f$ between CSI reporting bands is:

$$\Delta f \leq \frac{1}{2*\Delta\tau_{max}}.$$

14. The method of claim 13 wherein the maximum frequency gap $\Delta f$ is less than five subbands.

15. The method of claim 1 wherein compensating for the estimated phase and delay errors for the plurality of transmit antenna branches of the base station comprises applying amplitude correction and phase correction to the downlink signal for at least some of the plurality of antenna branches.

16. The method of claim 15 wherein the amplitude correction and the phase correction are applied in the time domain.

17. The method of claim 15 wherein the amplitude correction and the phase correction are applied in the frequency domain.

18. The method of claim 15 wherein the amplitude correction and the phase correction are applied in the both the time domain and the frequency domain.

19. A base station of a cellular communications system, the base station comprising:
a plurality of antenna branches each comprising a respective transmitter coupled to a respective antenna;
at least one receiver; and
at least one processor associated with the plurality of antenna branches and the at least one receiver, the at least one processor configured to cause the base station to:
configure a user equipment, UE, for a first plurality of channel state information, CSI, reports associated to a respective first plurality of CSI reporting bands, the respective first plurality of CSI reporting bands being either: (a) different subsets of a plurality of sub-bands within a downlink bandwidth of the base station or (b) different downlink bandwidth parts served by the base station;
receive the first plurality of CSI reports from the UE;
estimate phase and delay errors for a plurality of transmit antenna branches of the base station; and
compensate for the estimated phase and delay errors for the plurality of transmit antenna branches of the base station.

20. A method implemented in a base station for a cellular communications system, the method comprising:
configuring a user equipment, UE, for a first plurality of channel state information, CSI, reports associated to a respective first plurality of CSI reporting bands, the respective first plurality of CSI reporting bands being either: (a) different subsets of a plurality of sub-bands within a downlink bandwidth of the base station or (b) different downlink bandwidth parts served by the base station;
receiving the first plurality of CSI reports from the UE; and
estimating phase and delay errors for a plurality of transmit antenna branches of the base station based on the plurality of CSI reports received from the UE,
wherein the plurality of CSI reports is only two CSI reports, and wherein the CSI reporting band configuration for each of the two CSI reports is based on a delay range $\Delta\tau_{max}$.

* * * * *